United States Patent Office 3,166,544
Patented Jan. 19, 1965

3,166,544
PROCESS AND CATALYST FOR
POLYMERIZING OLEFINS
Adam Orzechowski, Waltham, and James C. MacKenzie,
Wellesley Hills, Mass., assignors to Cabot Corporation,
Boston, Mass., a corporation of Delaware
No Drawing. Filed Apr. 7, 1964, Ser. No. 358,107
16 Claims. (Cl. 260—93.7)

This invention relates to the polymerization and copolymerization of mono-olefins and di-olefins such as ethylene, propylene, butene-1, styrene, isoprene and butadiene and includes within its scope improved catalysts for such polymerization reactions.

This case is a continuation-in-part of copending applications Serial No. 209,232, filed July 11, 1962, now abandoned; Serial No. 218,196, filed August 1, 1962, now abandoned; and Serial No. 21,110, filed April 11, 1960, which last application was in turn a continuation-in-part of Serial No. 2,861, filed January 18, 1960, now abandoned, all by Orzechowski and MacKenzie.

It is a principal object of the present invention to provide a novel catalyst for polymerizing mono-olefins, di-olefins and mixtures thereof.

It is another object of the present invention to provide an improved process for polymerizing mono-olefins, di-olefins and mixtures thereof.

Other objects of the present invention will in part be obvious and will in part appear hereinafter.

Copending application Serial No. 21,110 discloses novel catalyst components suitable for use in the polymerization and copolymerization of mono-olefins and di-olefins, which components comprise the product of the metathetical reaction carried out under certain conditions between a halide-type compound of Group IVa, Va or VIa metal and hydroxyl groups on the surface of a finely-divided particulate inorganic solid. In accordance with the present invention, it was discovered that excellent catalysts for the polymerization of mono- and di-olefins are formed when said catalyst components are heated in the presence of certain silane compounds to temperatures above about 100° C. and preferably above about 140° C. The polymerization or copolymerization of the mono- and di-olefins can be effected at suitable temperatures within the range of from about —25° C. to about 250° C., and pressures ranging upwardly from above about 50 p.s.i.g. to any desired maximum pressure, for example, 30,000 p.s.i.g. or even higher pressures.

Inorganic solids suitable for the purposes of the present invention generally include any inorganic compound which is available in finely-divided particulate form with hydroxyl groups on the surface thereof. For example, metal oxides such as titania, alumina and silica, silicates such as chrysotile, and aluminates such as corundum are all generally suitable for the purposes of the present invention. For best results, however (as explained in more detail in copending application Serial No. 21,110) inorganic solids having an average particle diameter of less than about 0.1 micron and a minimum hydroxyl group concentration on the surface thereof of about 1×10⁻⁴ equivalents per gram are definitely preferred.

Many halide-type compounds of Group IVa, Va or VIa metals (hereinafter generally referred to as transition metal halides) are suitable for the purposes of the present invention. These include the compounds conforming to the general empirical formula:

$$TO_aX_b$$

wherein T is a metal of Group IVa, Va or VIa (where the group numbers correspond to the Mendeleev Periodic System); O is oxygen; $a$ is a number from 0 to 2; each X is any halogen; and $b$ is a number from 1 to 6.

Examples of suitable compounds conforming to the general formula are halides of Group IVa, Va or VIa metals such as titanium tetrachloride, zirconium tetrachloride, vanadium tetrachloride and titanium tetraiodide, and oxyhalides of Group IVa, Va or VIa metals, such as vanadium oxychloride and chromium oxychloride.

The conditions under which reaction between the transition metal halide and the finely-divided inorganic solid can be accomplished are subject to considerable variation. However, in order to obtain a catalyst component with exceptionally high activity and reproducible character it has been found to be all important that the finely-divided inorganic solid be essentially dry and anhydrous (i.e. free of molecular water in any form) at the time it is brought into contact with the transition metal halide. In addition, it is recommended that said reaction be achieved so as to allow by-products of the reaction (for example, HCl) to be eliminated from the reaction zone in order to insure that said reaction goes to completion. Generally, the said reaction can be carried out by contacting said inorganic solid with said transition metal halide, preferably in a solution thereof in an inert hydrocarbon medium, and maintaining the two reactants in intimate contact for a period of time sufficient to effect the desired chemical reaction resulting in the chemical bonding of the transition metal to the inorganic solid. The length of time required to effect a given amount of such reaction and chemical bonding is largely dependent upon the temperature of the reaction mixture. Generally speaking almost any temperature between about 0° C. and 300° C. can be used satisfactorily, but room temperature to about 105° C. is generally preferred. Assuming provision is made for intimate contact of the dry inorganic solid and the transition metal halide, the minimum time required to accomplish the chemical reaction needed will vary from periods of about 10 hours at room temperature to periods of about 15 minutes at temperatures of 100° C. or over. Temperatures higher than a few hundred degrees centigrade, e.g. 500° C., are normally completely needless and therefore of little or no interest.

Elimination of by-products of the reaction from the reaction zone, i.e., the reaction medium, can be accomplished in many ways such as by sweeping the reaction vessel with an inert gas, by carrying out the reaction at sufficiently elevated temperatures to drive by-products out of the reaction zone, i.e. usually out of the reaction medium, and by complexing or reacting said by-products with suitable substances such as tertiary amines, tertiary arsines, tertiary phosphines, terpenes, terpinenes, tetra-substituted hydrazines, carbides such as calcium carbide, and other substances such as sodium hydride which will react or complex with said by-products and thereby eliminate them.

Silane compounds suitable for the purposes of the present invention are those compounds conforming to the empirical formula:

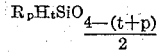

wherein each R is chosen from the group consisting of monovalent hydrocarbon radicals, monovalent alkoxy radicals, monovalent aryloxy radicals, and the halogens; $p$ is a number from 0 to 3; each H is a hydride radical; $t$ is a number from 1 to 4; Si is silicon; and O is oxygen.

Specific examples of R groups for substitution in the above empirical formula include methyl, ethyl, n-propyl, isobutyl, n-amyl, isoamyl, hexyl, n-octyl, n-dodecyl, and the like; 2-butenyl, 2-methyl-2-butenyl and the like; cyclopentylmethyl, cyclohexylethyl, cyclopentylethyl, methylcyclopentylethyl, 4-cyclohexenylethyl and the like; 2-phenylethyl, 2-phenylpropyl, α-naphthylethyl, methylnaphthylethyl, and the like; cyclopentyl, cyclohexyl, 2,2,1-bicycloheptyl, and the like; methylcyclopentyl, dimethylcyclopentyl, ethylcyclopentyl, methylcyclohexyl, dimethylcyclohexyl, ethylcyclohexyl, isopropylcyclohexyl, 5-cyclopentadienyl, and the like; phenylcyclopentyl, phenylcyclohexyl, and the corresponding naphthyl derivatives of cycloalkyl groups, and the like; phenyl, tolyl, xylyl, ethylphenyl, xenyl, naphthyl, methylnaphthyl, dimethylnaphthyl, ethylnaphthyl, cyclohexylphenyl, and the like; and aryloxy and alkoxy groups such as methoxy, ethoxy, isobutoxy, n-octyloxy, dodecyloxy, phenoxy and 1,2-naphthoxy.

Specific examples of compounds conforming to the empirical formula:

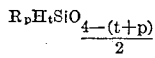

and suitable for the purposes of the present invention are triethylsilane—$HSi(C_2H_5)_3$;
trimethoxysilane—$HSi(OCH_3)_3$;
tribenzylsilane—$HSi(CH_2C_6H_5)_3$.
triphenoxysilane—$HSi(OC_6H_5)_3$;
dicyclohexylphenylsilane—$C_6H_5HSi(C_6H_{11})_2$;
tricyclohexylsilane—$HSi(C_6H_{11})_3$;
tri-n-propylsilane—$HSi(n-C_3H_7)_3$;
methyldiethylsilane—$CH_3HSi(C_2H_5)_2$;
silane—$H_4Si$;
monochlorosilane—$H_3SiCl$;
methylmonochlorosilane—$H_2SiClCH_3$;
diethylmonochlorosilane—$HSiCl(C_2H_5)_2$;
diphenylsilane—$H_2Si(C_6H_5)_2$;
dibromosilane—$H_2SiBr_2$; and
ethyldichlorosilane—$HSiCl_2C_2H_5$;
diethoxymonochlorosilane—$HSiCl(OC_2H_5)_2$;
diethoxysilane—$H_2Si(OC_2H_5)_2$;
methyldifluorosilane—$HSF_2CH_3$;
n-butyldichlorosilane—$HSiCl_2n-C_4H_9$;
cyclic alkyl hydrogen silicones such as $(CH_3HSiO)_3$ and $(CH_3HSiO)_6$;
linear alkyl hydrogen silicones such as
$(CH_3)_2HSiOSiH(CH_3)_2$ and
$(CH_3)_2HSiOSiH(CH_3)_2OSiH(CH_3)_2$.

The catalyst of the present invention is readily formed when the product of the metathetical reaction (as described above) of hydroxyl groups in the surface of an inorganic solid and a halide-type compound of a metal of Groups IV$a$, V$a$ or VI$a$ is heated in an inert environment in the presence of a silane compound to a temperature above about 100° C. and preferably above about 140° C. for a period of at least about 1 hour. At higher temperatures, shorter periods of time suffice. At lower temperatures, the formation of the catalyst either does not occur at all or does not proceed to completion as will readily be seen hereinafter. Temperatures above about 250° C. are normally unnecessary.

Using the catalysts of this invention, polymerization of the mono-olefin and diolefin monomers can be accomplished in the absence of liquids (other than the monomers themselves), solvents or diluents, for example, in the gas phase, but it is usually more convenient to effect polymerization in the presence of a substantially inert liquid reaction medium. Accordingly, an inert liquid reaction medium is preferably supplied to the reaction zone.

Several classes of hydrocarbons or their mixtures which are liquid and substantially inert under the polymerization conditions of the present process constitute suitable liquid reaction media. Thus, various classes of saturated hydrocarbons such as pure alkanes or cycloalkanes or commercially available mixtures, freed of harmful impurities, are generally suitable for the purposes of the present invention. For example, straight run naphthas or kerosenes containing alkanes and cycloalkanes and liquid or liquefied alkanes such as n-hexane, 2,3-dimethyl-butane, n-dodecane, dimethylcyclopentane, methyldecalins, and the like are suitable. Also members of the aromatic hydrocarbon series, such as isopropyl benzene, ethyltoluene, isoamylbenzene, and particularly the mononuclear aromatic hydrocarbons such as xylenes, mesitylene and xylene-p-cymene mixtures, and the like are completely suitable.

The proportion of surface reacted particulate inorganic solid to silane compound utilized in preparing the catalyst is not usually a critical feature of the process. We have found from experience that a molar ratio of from 0.1 to 5 mols of the silane compound per atom of transition metal chemically combined with the surface of the finely-divided solid is to be preferred.

The quantity of catalyst, i.e. comprising both the surface reacted finely-divided solid and the silane compound, to be utilized in the polymerization reaction may vary, but in general, the total quantity of catalyst that need be employed based on the weight of the charging stock is very small particularly when a very fine particle size oxide is utilized as the inorganic solid.

The contact time or space velocity employed in the polymerization process will be selected with reference to the other process variables such as the particular catalysts utilized, the specific type of product desired, and the extent of monomer conversion desired in any given run or pass over the catalyst. In general, this variable is readily adjustable to obtain the desired results.

There follow a number of illustrative non-limiting examples:

Example 1

To a 2000 milliliter, three neck, glass reaction vessel equipped with a stirrer, a condenser and nitrogen inlet and outlet tubes, there is added 20 grams of "Cab-O-Sil," a pyrogenic silica produced by Cabot Corporation, which has an average particle diameter of 10 millimicrons and a hydroxyl group content on the surface thereof of about 1.5 milliequivalents per gram. To said reaction vessel there is added 1650 milliliters of benzene and the resulting translucent slurry is dried by being heated to, and maintained at, the boiling point of benzene, i.e. about 80° C., for about 20 hours. A water/benzene azeotrope is then removed from the reaction vessel by periodic distillation until about 450 milliliters of distillate has been removed. The vessel is then cooled and charged with 20 millimoles of titanium tetrachloride. The resulting slurry is then refluxed for 7 hours with continuous stirring while being swept by a stream of dry nitrogen. Subsequently, the extent of the reaction between the titanium tetrachloride and the hydroxyl groups on the silica is determined by measuring the quantity of HCl that was produced and by testing the liquid contents of the vessel for the absence therein of titanium tetrachloride, and the said silica is found to have 20 milliatoms of titanium chemically bound to the surface thereof. A sample of 60 milliliters of this slurry containing about 1 milliatom of titanium bound to the surface of about 1 gram of silica, is then transferred from this reaction vessel to a 100 cc. stainless steel bomb which has been previously flushed with dry nitrogen. Next, 2 millimoles of triphenylsilane is added to the bomb and the bomb is pressurized to 1200 p.s.i. with ethylene. The bomb is then continuously agitated and heated to, and maintained at, about 100° C. for about 1 hour while the pressure therein is maintained at about 1200 p.s.i. by the intermittent introduction of additional ethylene. The reaction products are analyzed and it is found that no solid polymer has been produced.

Example 2

This example is a duplicate of Example 1 except that the bomb is not immediately pressurized with ethylene after the introduction thereinto of the triphenylsilane. Instead, the bomb is first heated to, and maintained at, about 145° C. for about 2 hours while being continuously agitated. After being allowed to cool to about 100° C. at which temperature the bomb is thereafter maintained, the bomb is pressurized to, and maintained at, 1200 p.s.i. with ethylene for 1 hour. The reaction products are analyzed and it is found that about 190 grams of polyethylene having a density of 0.96 have been produced. The polymer product is found to have a crystalline melting point of about 130–135° C. It is further found that none of the ethylene has been converted to a normally liquid product.

When under the same conditions either the triphenylsilane or the silica cocatalyst carrying titanium chemically combined to the surface thereof is utilized alone as the catalyst, no polymer is produced.

*Example 3*

To a 100 cc. stainless steel bomb, there is added about 60 milliliters of the cocatalyst slurry produced in Example 1 which contains about 1 milliatom of titanium bound to the surface of about 1 gram of silica. The procedure of Example 2 is then followed precisely except that propylene is utilized instead of ethylene. The contents of the bomb are analyzed and it is found that solid polypropylene has been formed.

*Example 4*

To a 2000 milliliter, three neck, glass reaction vessel there is added 20 grams of "P-25," a pyrogenic titania produced by Deutsche Gold- und Silber-Scheideanstalt vormals Roessler and which has an average particle diameter of about 20 millimicrons and a hydroxyl group content on the surface thereof of between about 1 and 1.4 milliequivalents per gram. Said reaction vessel is then placed in a vacuum drying oven heated to a temperature of about 110° C. for about 24 hours. Subsequently, the vessel is sealed without exposing said titania to the atmosphere and there is charged to said vessel 20 millimoles of vanadium oxytrichloride in 1000 milliliters of anhydrous isooctane. The vessel is then continuously stirred, and maintained at refluxing temperature for a period of about 8 hours while the contents thereof are swept by a stream of dry nitrogen. Subsequently, the extent of the reaction between the vanadium oxytrichloride nad the titania is determined by measuring the quantity of HCl that was produced and by testing the liquid contents of the vessel for the absence therein of vanadium oxytrichloride and the said titania is found to have 20 milliatoms of vanadium chemically bound to the surface thereof. 100 milliliters of this slurry containing 2 grams of titania, and 2 milliatoms of vanadium is then transferred from this reaction vessel to a one liter stirred autoclave which has been previously flushed with dry nitrogen. Next, 5 millimoles of triethoxysilane are added to the autoclave and the autoclave is pressurized to 1000 p.s.i. with ethylene. The autoclave is then continuously agitated and heated to, and maintained at, about 140° C. for about 3 hours during which time the pressure therein is maintained at about 1000 p.s.i. by the intermittent introduction of ethylene. The reaction products are analyzed and it is found that solid polyethylene has been formed.

*Example 5*

To a 2000 milliliter, three neck, glass reaction vessel equipped with a stirrer, a condenser and nitrogen inlet and outlet tubes, there is added 25 grams of "Cab-O-Sil." To said reaction vessel there is added 1700 milliliters of benzene, and the resulting translucent slurry is dried by being heated to, and maintained at, the boiling point of benzene, i.e. about 80° C., for about 20 hours, while a water/benzene azeotrope is removed from the reaction vessel by periodic distillation until about 450 milliliters of distillate has been removed. The vessel is then cooled and charged with 25 millimoles of titanium tetrachloride. The resulting slurry is then refluxed for about 6 hours with continuous stirring. Subsequently, the extent of the reaction between the titanium tetrachloride and the hydroxyl groups in the surface of the silica is determined by measuring the quantity of HCl that was produced and by testing the liquid contents of the vessel for the absence therein of titanium tetrachloride, and the said silica is found to have 25 milliatoms of titanium chemically bound to the surface thereof. A sample of 50 milliliters of this slurry containing about 1 milliatom of titanium bound to the surface of about 1 gram of silica, is then transferred from this reaction vessel to a 100 cc. stainless steel bomb which has been previously flushed with dry nitrogen. Next, 2 millimoles of diethysilane is added to the bomb and the bomb is pressurized to 1000 p.s.i. with ethylene. The bomb is then continuously agitated and heated to and maintained at about 80° C. for about 1 hour while the pressure therein is maintained at about 1000 p.s.i. by the intermittent introduction of additional ethylene. The reaction products are analyzed and it is found that no solid polymer has been produced.

*Example 6*

This example is a duplicate of Example 5 except that the bomb is not immediately pressurized with ethylene after the introduction thereinto of the diethylsilane. Instead, the bomb is first heated to and maintained at about 150° C. for about 2 hours while being continuously agitated. After being allowed to cool to about 80° C. at which temperature the bomb is thereafter maintained, the bomb is pressurized to, and maintained at, 1000 p.s.i. with ethylene for 1 hour. The reaction products are analyzed and it is found that about 200 grams of polyethylene having a density of 0.96 has been produced. The polymer product is found to have a crystalline melting point of about 130–135° C. It is further found that none of the ethylene has been converted to a normally liquid product.

When under the same conditions either the diethylsilane or the silica cocatalyst carrying titanium chemically combined to the surface thereof is utilized alone as the catalyst no polymer is produced.

*Example 7*

To a 1000 milliliter, three neck, glass reaction vessel there is added 10.6 grams of "Alon," a pyrogenic alumina produced by Deutsche Gold- und Silber-Scheideanstalt vormals Roessler and which has an average particle diameter of about 10–40 millimicrons and a hydroxyl group content on the surface thereof of about 0.7 milliequivalent per gram. Said reaction vessel is then placed in a vacuum drying oven heated to a temperature of about 110° C. for about fifteen hours. Subsequently, the vessel is sealed without exposing said alumina to the atmosphere and there are charged to said vessel 5 millimoles of vanadium oxytrichloride in 600 milliliters of isooctane. The vessel is then continuously stirred, and maintained at a temperature of about 98° C. for a period of about 10 hours. Subsequently, the extent of the reaction between the vanadium oxytrichloride and the alumina is determined by measuring the quantity of HCl that was produced and by testing the liquid contents of the vessel for the absence therein of vanadium oxytrichloride and the said alumina is found to have 5 milliatoms of vanadium chemically bound to the surface thereof. 240 milliliters of this slurry containing 4.24 grams of alumina, and 2 milliatoms of vanadium is then transferred from this reaction vessel to a one liter stirred autoclave which has been previously flushed with dry nitrogen. Next, 5 millimoles of silane ($SiH_4$) are added to the autoclave. The autoclave is then continuously agitated and heated to and maintained at about 150° C. for about 1 hour. Next, the autoclave is cooled to and maintained at about 50° C. and 250 grams of butadiene are introduced into the autoclave. After about 3 hours, the reaction products are analyzed and it is found that about 30 grams of solid polybutadiene has been produced.

The polymers produced by the process of this invention can be subjected to such aftertreatment as may be desired to fit them for particular uses or to impart desired properties. Thus, the polymers can be extruded, mechanically milled, filmed or cast, or converted to sponges or latices. Also, antioxidants, stabilizers, fillers such as carbon black or additional silica, extenders, plasticizers, pigments, insecticides, fungicides, etc., can be incorporated into the polymers.

Obviously, many changes can be made in the above-described examples and procedure without departing from the scope of the invention. For example, although only Group IVa, Va and VIa metal chlorides are mentioned in the above examples, transition metal bromides, iodides and fluorides are also suitable for the purposes of the present invention.

Also, pyrogenically coformed, or coprecipitated metal oxides, or metal oxides coformed with, or mixed with, other compounds are suitable for the purposes of the present invention wherever "inorganic solid" is mentioned. It is pointed out that it is intended and therefore it should be understood that for the purposes of the present specification and the claims appended thereto, the term, metal oxide, includes silica.

Accordingly, it is intended that the above disclosure be regarded as illustrative and as in no way limiting the scope of the invention.

What we claim is:

1. A polymerization catalyst which comprises the reaction product of
   (a) a finely-divided inorganic solid having an average particle diameter of less than about 0.1 micron and carrying in chemical combination on the surface thereof at least about $1 \times 10^{-4}$ equivalents per gram structures conforming to the formula $$TO_aX_b$$

wherein T is a metal chosen from the group consisting of the metals of Groups IVa, Va and VIa; O is oxygen; $a$ is a number from 0 to 2; each X is any halogen; $b$ is a number from 1 to 5; and where said structures are chemically linked directly from T to at least one oxygen atom in the surface of said solid, and
   (b) an organometallic compound conforming to the formula $$R_pH_tSiO_{\frac{4-(t+p)}{2}}$$

wherein each R is chosen from the group consisting of monovalent hydrocarbon radicals, monovalent alkoxy radicals, monovalent aryloxy radicals, and the halogens; $p$ is a number from 0 to 3; each H is a hydride radical; $t$ is a number from 1 to 4; Si is silicon; and O is oxygen.

2. The catalyst of claim 1 wherein each X in the formula
$$TO_aX_b$$
is chlorine.

3. The catalyst of claim 1 wherein in said formula
$$TO_aX_b$$
T is a metal of Group IVa.

4. The catalyst of claim 1 wherein in said formula
$$TO_aX_b$$
T is titanium.

5. The catalyst of claim 1 wherein in said formula
$$TO_aX_b$$
T is titanium; each X is chlorine and $b$ is 3.

6. The catalyst of claim 1 wherein in said formula
$$TO_aX_b$$
T is a metal of Group Va.

7. The catalyst of claim 1 wherein in said formula
$$TO_aX_b$$
T is vanadium.

8. The catalyst of claim 1 wherein in said formula
$$TO_aX_b$$
T is a metal of Group VIa.

9. The catalyst of claim 1 wherein in said formula
$$R_pH_tSiO_{\frac{4-(t+p)}{2}}$$
$p$ is 2.

10. The catalyst of claim 1 wherein in said formula
$$R_pH_tSiO_{\frac{4-(t+p)}{2}}$$
each R is a monovalent hydrocarbon radical and $p$ is 3.

11. The catalyst of claim 1 wherein in said formula
$$R_pH_tSiO_{\frac{4-(t+p)}{2}}$$
each R is a monovalent hydrocarbon radical and $p$ is 2.

12. A process for polymerizing a substance chosen from the group consisting of a mono-olefin, mixtures of mono-olefins, a di-olefin, mixtures of di-olefins, and mixtures thereof which comprises contacting said substance at temperatures between about $-25°$ C. and $250°$ C. with a catalyst comprising
   (a) a finely-divided inorganic solid having an average particle diameter of less than about 0.1 micron and carrying in chemical combination on the surface thereof at least about $1 \times 10^{-4}$ equivalents per gram of structures conforming to the formula $$TO_aX_b$$

where T is a metal chosen from the group consisting of the metals of Groups IVa, Va and VIa; O is oxygen; $a$ is a number from 0 to 2; each X is any halogen; $b$ is a number from 1 to 5; and where said structures are chemically linked directly from T to at least one oxygen atom in the surface of said solid, and
   (b) an organometallic compound conforming to the formula $$R_pH_tSiO_{\frac{4-(t+p)}{2}}$$

wherein each R is chosen from the group consisting of monovalent hydrocarbon radicals, monovalent alkoxy radicals, monovalent aryloxy radicals, and the halogens; $p$ is a number from 0 to 3; each H is a hydride radical; $t$ is a number from 1 to 4; Si is silicon; and O is oxygen.

13. The process of claim 12 wherein the substance polymerized is an α-mono-olefin.

14. The process of claim 12 wherein the substance polymerized is ethylene.

15. The process of claim 12 wherein the substance polymerized is propylene.

16. The process of claim 12 wherein the substance polymerized is a di-olefin having a double bond in the alpha position.

No references cited.

JOSEPH L. SCHOFER, *Primary Examiner.*